US010048709B2

(12) United States Patent
Baerthlein et al.

(10) Patent No.: US 10,048,709 B2
(45) Date of Patent: Aug. 14, 2018

(54) SYSTEM AND METHOD FOR REGULATION OF VOLTAGE ON AN ELECTRIC POWER SYSTEM

(71) Applicant: General Electric Company, Schenectady, NY (US)

(72) Inventors: Eva-Maria Baerthlein, Bavaria (DE); Eva Bernal Serra, Bavaria (DE); Marianne Luise Susanne Hartung, Bavaria (DE); Ara Panosyan, Bavaria (DE); Luca Parolini, Moosburg a.d. Isar (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/269,110

(22) Filed: Sep. 19, 2016

(65) Prior Publication Data

US 2018/0081380 A1    Mar. 22, 2018

(51) Int. Cl.
*G05F 1/14*    (2006.01)
*G05F 1/147*    (2006.01)

(52) U.S. Cl.
CPC .................................. *G05F 1/147* (2013.01)

(58) Field of Classification Search
CPC . G05F 1/14; G05F 1/147; G05F 1/153; G05F 1/16; G05F 1/20; G05F 1/247; H02M 5/10

(Continued)

(56) References Cited

U.S. PATENT DOCUMENTS 3,581,188 A    5/1971 Watanabe et al.
3,662,253 A    5/1972 Yamamoto
(Continued)

FOREIGN PATENT DOCUMENTS

EP    2482415 A1    8/2012
EP    2 506 384 A1    10/2012
(Continued)

OTHER PUBLICATIONS

Cheng Gao et al., "Advanced Voltage Control Strategy for On-Load Tap-Changer Transformers with Distributed Generations", Universities' Power Engineering Conference (UPEC), Proceedings of 2011 46th International, pp. 1-6, Sep. 5-8, 2011, Soest, Germany.

(Continued)

*Primary Examiner* — Adolf Berhane
(74) *Attorney, Agent, or Firm* — GE Global Patent Operation; Nitin Joshi

(57) ABSTRACT

An electric power system includes an OLTC transformer including a plurality of primary and secondary windings inductively coupled to each other. The electric power system includes at least one on-load tap changer coupled to at least one of the primary and secondary windings that is selectively configurable to regulate the portion of the primary and secondary windings inductively coupled to each other. The electric power system also includes a plurality of buses coupled to the transformer and are positioned downstream therefrom. The electric power system further includes at least one processor coupled to the tap changer configured to regulate a voltage bandwidth of the tap changer as a function of estimated voltage values of at least one bus as estimated based on a priori values of power/current transmitted through each bus. The a priori values are substantially based on measured power/current transmission through the on-load tap changer.

21 Claims, 10 Drawing Sheets

(58) Field of Classification Search
USPC .................................. 323/255–258, 340–343
See application file for complete search history.

(56) References Cited

U.S. PATENT DOCUMENTS

| | | | |
|---|---|---|---|
| 5,006,784 | A | 4/1991 | Sonntagbauer |
| 5,327,355 | A | 7/1994 | Chiba et al. |
| 5,821,716 | A | 10/1998 | Okanik |
| 5,990,667 | A | 11/1999 | Degeneff et al. |
| 6,313,614 | B1 | 11/2001 | Persson et al. |
| 7,255,369 | B2 | 8/2007 | Matsumiya |
| 7,355,369 | B2 * | 4/2008 | Lavieville ............... H01F 29/04 |
| | | | 323/255 |
| 7,642,736 | B2 | 1/2010 | Genkawa |
| 7,982,442 | B2 | 7/2011 | Solyom et al. |
| 7,989,983 | B2 | 8/2011 | Folts et al. |
| 7,990,743 | B2 | 8/2011 | Walling et al. |
| 7,994,658 | B2 | 8/2011 | Cardinal et al. |
| 8,203,319 | B2 | 6/2012 | Fujita et al. |
| 8,437,883 | B2 | 5/2013 | Powell et al. |
| 8,476,874 | B2 | 7/2013 | Labuschagne et al. |
| 8,577,510 | B2 | 11/2013 | Powell et al. |
| 8,847,570 | B1 | 9/2014 | Bell |
| 9,106,078 | B2 | 8/2015 | Bell |
| 9,400,512 | B2 * | 7/2016 | Baerthlein ................ G05F 1/14 |
| 9,600,004 | B2 * | 3/2017 | Baerthlein ................ G05F 1/14 |
| 2004/0070359 | A1 | 4/2004 | Dohnal et al. |
| 2010/0001700 | A1 | 1/2010 | Santos |
| 2010/0090674 | A1 | 4/2010 | Bell |
| 2011/0005910 | A1 * | 1/2011 | Fujita ................... H01H 9/0011 |
| | | | 200/5 B |
| 2011/0215790 | A1 | 9/2011 | Hyde et al. |
| 2011/0304141 | A1 | 12/2011 | Van Dyck et al. |
| 2012/0022713 | A1 | 1/2012 | Deaver, Sr. et al. |
| 2012/0112719 | A1 | 5/2012 | Xia et al. |
| 2012/0200279 | A1 | 8/2012 | Pamulaparthy et al. |
| 2012/0306471 | A1 | 12/2012 | Green et al. |
| 2013/0030591 | A1 | 1/2013 | Powell et al. |
| 2013/0134779 | A1 | 5/2013 | Watanabe et al. |
| 2013/0307494 | A1 | 11/2013 | Meinecke |
| 2013/0310993 | A1 | 11/2013 | Meinecke |
| 2015/0168965 | A1 * | 6/2015 | Baerthlein ................ G05F 1/14 |
| | | | 323/340 |
| 2015/0268677 | A1 | 9/2015 | Clark |
| 2015/0276877 | A1 * | 10/2015 | Biswas ............... G01R 31/3275 |
| | | | 702/58 |
| 2015/0286227 | A1 | 10/2015 | Watanabe et al. |
| 2015/0301538 | A1 * | 10/2015 | Panosyan ................. G05F 1/20 |
| | | | 323/343 |
| 2015/0303861 | A1 | 10/2015 | Panosyan et al. |
| 2016/0041227 | A1 * | 2/2016 | Mao ................... G01R 31/3271 |
| | | | 324/415 |
| 2016/0146191 | A1 * | 5/2016 | Berroteran Gil ....... F03D 9/003 |
| | | | 290/44 |
| 2017/0250542 | A1 * | 8/2017 | Panosyan ................. H02J 4/00 |

FOREIGN PATENT DOCUMENTS

| | | |
|---|---|---|
| EP | 2 858 015 A1 | 4/2015 |
| GB | 895954 A | 5/1962 |
| JP | 2003102128 A | 4/2003 |
| JP | 4289514 B2 | 7/2009 |
| JP | 5774254 81 | 9/2015 |
| WO | 2015/029227 A1 | 3/2015 |
| WO | 2015/060520 A1 | 4/2015 |

OTHER PUBLICATIONS

Gao Fei et al., "Study on arcless switching experiments of hybrid on-load tap changer in transformers", Power System Technology (POWERCON), 2014 International Conference on, pp. 1287-1292, Oct. 20-22, 2014, Chengdu.

U.S. Appl. No. 14/617,065, filed Feb. 9, 2015, entitled System and Method for Regulation of Voltage on an Electrical Network.

PCT/US16/17093, filed Feb. 9, 2016, entitled System and Method for Regulation of Voltage on an Electrical Network.

Dohnal, Dieter, "On-Load Tap-Changers for Power Transformers: A Technical Digest," Maschinenfabrik Reinhausen GmbH, Regensburg, Germany, retrieved from website www.reinhausen.com/XparoDownload.ashx?raid=15497 (28 pgs).

European Search Report and Opinion, dated Sep. 22, 2015, for EP patent application No. EP 14197969.0 (5 pgs).

Extended European Search Report and Opinion issued in connection with corresponding EP Application No. 17189911.5 dated Jan. 26, 2018.

* cited by examiner $$\begin{cases} \hat{\mathbf{i}}_c(k+1) = \bar{A}\hat{\mathbf{i}}_c(k) + \mathbf{w}(k) \\ \begin{bmatrix} v_{\pi c}(k) \\ i_{\pi c}(k) \\ \mathbf{i}^o(k) \end{bmatrix} = H\hat{\mathbf{i}}_c(k) + \begin{bmatrix} A_1 \\ 0 \\ \vdots \\ 0 \end{bmatrix} v_{ref} + \mathbf{v}(k), \end{cases}$$
Equation (13)

where $I$ is the identity matrix, and where:

$$H = \begin{bmatrix} B_{t1} & \cdots & B_{ta} \\ 1 & 1 & 1 & \cdots & 1 \\ \hline 1 & 0 & 0 & \cdots & 0 \\ 0 & 1 & 0 & \cdots & 0 \\ 0 & 0 & 1 & \cdots & 0 \\ 0 & 0 & 0 & \ddots & \\ 0 & 0 & 0 & & 1 \end{bmatrix},$$
Equation (14)

FIG. 10

SYSTEM AND METHOD FOR REGULATION OF VOLTAGE ON AN ELECTRIC POWER SYSTEM

BACKGROUND

The field of the disclosure relates generally to electric power systems, and, more particularly, to electric power distribution systems including transformers with tap changers and their methods of operation.

At least some known electric power systems include electric transformers configured to regulate voltages through the use of on-load tap changers. An on-load tap changing (OLTC) transformer has several connection points, so called "taps", along at least one of its windings. With each of these tap positions a certain number of turns is selected. Since the output voltage of the OLTC transformer is determined by the turns ratio of the primary windings versus the secondary windings, the output voltage can be varied by selecting different taps. The tap position to connect to is determined by a suitable controller and tap selection is shifted through an on-load tap changing device. Since high voltages are involved, and the taps are changed while the OLTC transformer is under load, each time a tap is changed, arcing occurs. Arcing facilitates deterioration of the associated materials, thereby tending to decrease the service life of the tap changer mechanisms. Therefore, it is typically desirable to shift taps as infrequently as possible. However, it is not unusual to have dozens of tap changes over a 24-hour period, especially with an increasing share of variable and intermittent distributed generation (DG) and loads in the electric power system. The operators of the electric power system determine the tradeoff between the frequency and number of on-load tap changes with the subsequent wear on the tap changer and the quality of the voltage on the portion of the system maintained by the affected OLTC transformer.

Many known electric power systems include a growing share of distributed generation (DG), such as photovoltaic (PV) plants on residential rooftops, and loads, such as electric vehicles (EV), being connected to low voltage (LV) and medium voltage electric (MV) power networks and systems. As such, these additional DG and load points significantly increase the variability of the voltage on the portion of the system maintained by the affected OLTC distribution transformer, thereby increasing the frequency of commanded tap changes. In these cases, the critical voltage to be regulated (usually located at remote feeder ends) is spatially offset from the OLTC, which is located at the feeder head. Many remote feeder ends do not include voltage, current, and power measurement instruments due to the significant costs. Therefore, voltages at the remote feeder ends are typically controlled through regulating the voltage at the OLTC at the feeder head. Some known electric distribution systems have established, and in many cases, regulatory ranges for voltage regulation at the ends of the feeders, for example, within +/−5% or within +/−10% of established limits. As such, the voltage at the OLTC is regulated within a band tight enough to facilitate maintaining the feeder end voltage within established parameters, where the band needs to be sized to regulate the feeder end voltages without the aid of voltage instrumentation at the feeder ends.

Many known OLTC control systems are not configured to regulate the remote feeder voltages and maintain a lower number of tap changing operations for large amounts of DG and loads spread across the feeder. For example, some known OLTC control systems implement a variable bandwidth where the permissible voltage band at the OLTC is continuously adjusted based on the current network conditions as indicated by the measured power flow or current through the OLTC. However, this method assumes the worst case voltage drops and voltage rises for measured current or power flow in the associated feeders. For example, even at midnight, a worst case voltage rise of the largest PV power plant is assumed. These worst case assumptions limit the range of the variable voltage band at the OLTC, which may lead to unnecessary tap changing operations to facilitate maintaining the voltages at the remote feeder ends with a satisfactory margin to equipment parameters, i.e., some known electric distribution systems have ranges for the voltage at the end of the feeder within +/−5% or within +/−10% of the established limits.

BRIEF DESCRIPTION

In one aspect, an electric power system is provided. The electric power system includes an on-load tap changing (OLTC) transformer including a plurality of primary windings and a plurality of secondary windings. At least a portion of the primary windings and at least a portion of the secondary windings are inductively coupled to each other. The at least one on-load tap changer is coupled to at least one of the plurality of primary windings and the plurality of secondary windings. The at least one on-load tap changer is selectively configurable to regulate the at least a portion of the primary windings and the at least a portion of the secondary windings that are inductively coupled to each other. The electric power system also includes a plurality of buses coupled to the OLTC transformer. The plurality of buses are positioned downstream of the OLTC transformer. The electric power system further includes at least one processor coupled to the at least one on-load tap changer. The at least one processor is configured to regulate a voltage bandwidth of the on-load tap changer as a function of estimated voltage values of at least one bus of the plurality of buses as estimated based on a priori values of one of power and current transmitted through each bus of the plurality of buses. The a priori values of one of power and current are substantially based on one of measured power and measured current transmission through the on-load tap changer.

In a further aspect, a tap changer for an on-load tap changing (OLTC) transformer is provided. The OLTC transformer includes a plurality of primary windings and a plurality of secondary windings. The OLTC transformer also includes a plurality of taps. Each tap of the plurality of taps is coupled to a different portion of at least one of the plurality of primary windings and the plurality of secondary windings. The OLTC transformer is coupled to a plurality of buses downstream of the OLTC transformer. The tap changer includes a tap selection device configured to selectively engage a portion of the plurality of taps. The tap selection device also includes a drive device coupled to the tap selection device. The tap selection device further includes at least one processor coupled to the drive device. The at least one processor is configured to regulate a voltage bandwidth of the on-load tap changer as a function of estimated voltage values of at least one bus of the plurality of buses as estimated based on a priori values of one of power and current transmitted through each bus of the plurality of buses. The a priori values of one of power and current are substantially based on one of measured power and measured current transmission through the OLTC transformer.

In another aspect, a method of regulating a voltage on at least a portion of an electric distribution system is provided. The electric distribution system includes at least one on-load tap changing (OLTC) transformer that includes a plurality of primary windings and a plurality of secondary windings. The electric distribution system also includes a tap changer configured to regulate an inductive coupling between the plurality of primary windings and the plurality of secondary windings. The tap changer includes at least one processor. The OLTC transformer is coupled to a plurality of buses downstream of the OLTC transformer. The method includes measuring one of electric power flow and electric current flow transmitted through the OLTC transformer and measuring a voltage proximate the secondary windings. The method also includes regulating a voltage bandwidth of the tap changer, through the at least one processor, as a function of estimated voltage values of at least one bus of the plurality of buses as estimated based on a priori values of one of power and current transmitted through each bus of the plurality of buses. The a priori values of one of power and current are substantially based on one of measured power and measured current transmission through the OLTC transformer.

DRAWINGS

These and other features, aspects, and advantages of the present invention will become better understood when the following detailed description is read with reference to the accompanying drawings in which like characters represent like parts throughout the drawings, wherein.

Figure 7:
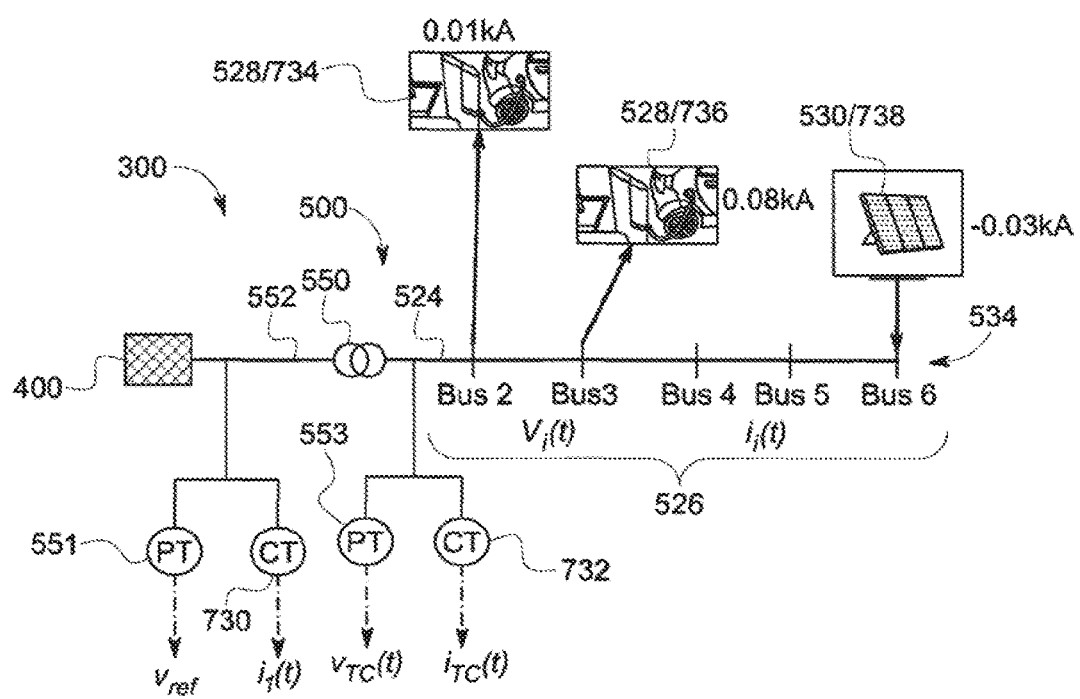
FIG. 7 is a schematic diagram of an exemplary plurality of distribution buses in a first configuration that may be in the electric power distribution system shown in FIGS. 3 and 4.
Figure 8:
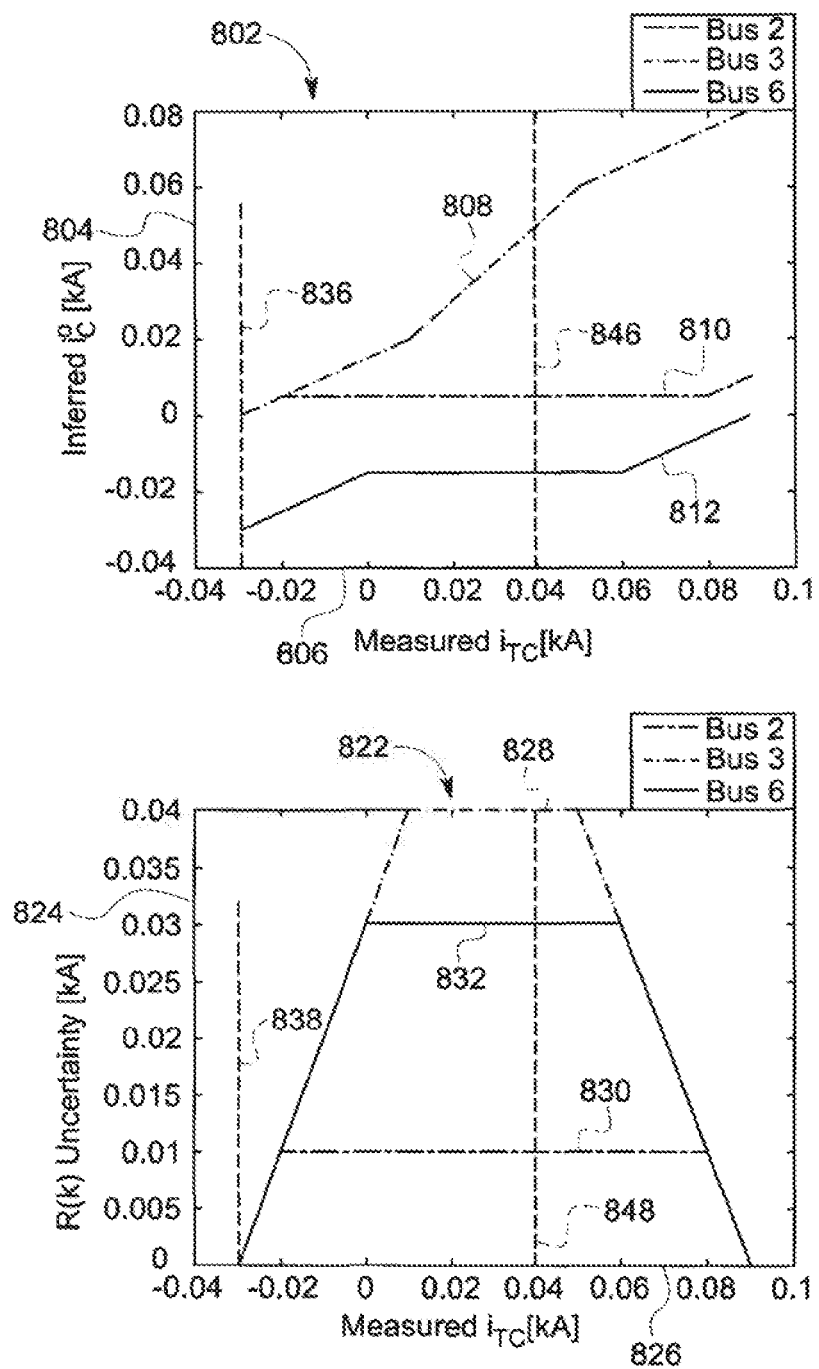
Figure 9:
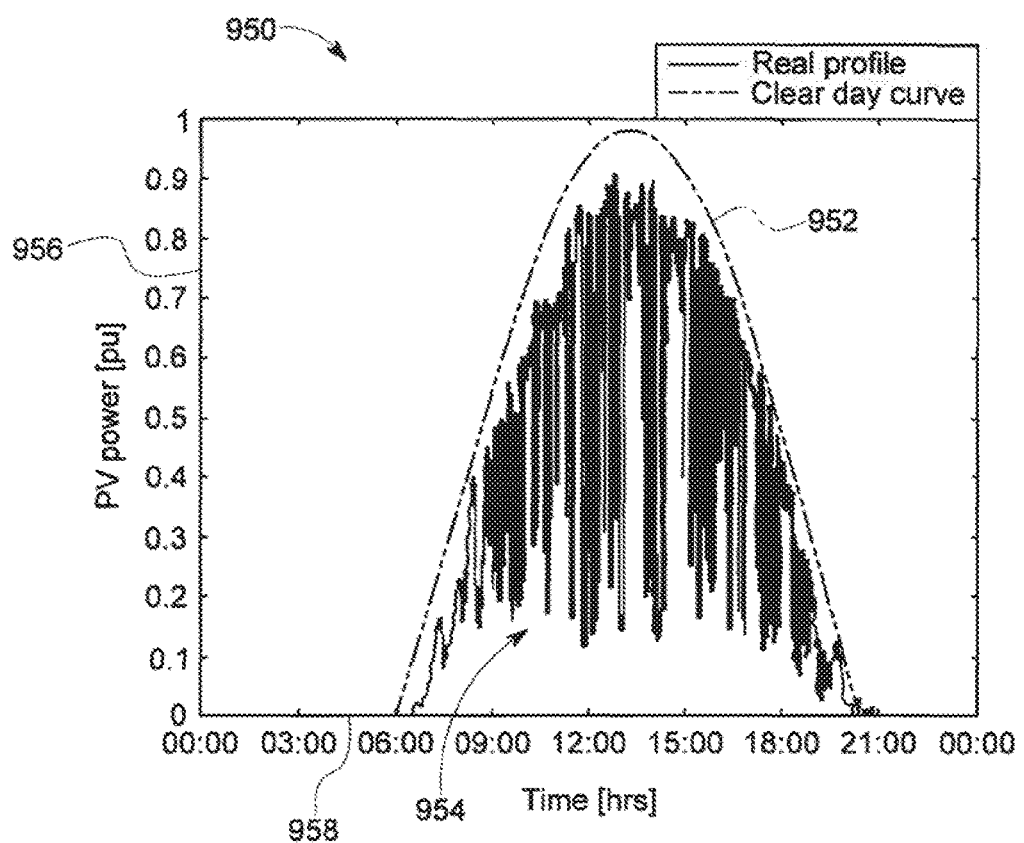

FIG. 8 is an exemplary graphical representation of a priori bus currents and the associated uncertainty values for the plurality of distribution buses shown in FIG. 7 for determining the a priori bus currents and the associated uncertainty values; and FIG. 9 is an exemplary graphical representation of a clear day curve and measured photovoltaic (PV) profile for a cloudy summer day that may be used for the plurality of distribution buses shown in FIG. 7 for determining the a priori bus currents and the associated uncertainty values.

FIG. 10 a modeling equation for the system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In addition, as used herein, the terms "permissible voltage range" and "permissible voltage band" are used interchangeably herein and broadly refer to those voltage bands/ranges, i.e., bandwidth associated with on-load tap changers (OLTCs) within electric power distribution systems to regulate the voltages on one or more feeder critical buses, and inherently, the buses between the transformer and the critical buses. Also, as used herein, the term "established voltage limits" broadly refers to those voltage bands/ranges and parameters associated with any bus in the electric power distribution systems, where such bands, ranges, and parameters are typically based on one or more of regulatory requirements, electrical system operator preferences, and equipment ratings. Therefore, the established voltage limits for the critical buses at least partially define the permissible voltage bandwidth at the OLTCs.

The embodiments of control schemes for the tap changers embedded within the on-load tap changing (OLTC) transformers within electric power distribution systems, as described herein, overcome a number of deficiencies of known control systems and provide a cost-effective method for regulating voltage on such distribution systems. Specifically, the embodiments described herein replace known control schemes that have variable bandwidths where the permissible voltage band at the OLTC transformer is continuously adjusted based on the current network conditions as indicated by the measured power flow or current transmission through the tap changer, where such known schemes assume worst case voltage drops and voltage rises in the associated feeders for each respective measured current or power flow values at the OLTC transformer. This leads to unnecessary tap changing operations. More specifically, additional information is used to reach a more realistic and accurate approximation for the present network state. Information such as actual load information, time-of-day data, and solar clear day data are used to generate a priori values for the present load demand and generation in the grid. Such a priori values include uncertainties, which are also calculated. Such uncertainties associated with a priori values are constrained through the use of the information described above. Based on these a priori values, the associated uncertainties, and the measured current/power at the OLTC, the currents at each bus in the network are estimated, and based on these estimated currents and the uncertainties (i.e., covariance) for such estimated bus currents, the voltages at each bus in the network are estimated with associated estimated voltage uncertainties, including inferring the critical voltage. The smaller the uncertainty in the a priori currents, the smaller the uncertainty in the bus voltage estimations. These voltage estimates and their uncertainties are used to compute the permissible voltage band at the tap changer. This estimation approach allows obtaining a more accurate assessment of the prevailing network state rather than invariably assuming the worst case as is done in the basic variable bandwidth approach. The more accurate estimations of power/current flows through the feeder system, and therefore the tap changer, facilitate relaxing restrictions. This in turn will widen the permissible voltage range at the OLTC transformer leading to less tap changing operations.

Therefore, the embodiments described herein dynamically and adaptively regulate voltage while decreasing tap changes with respect to most known tap changer control systems, thereby facilitating smooth and stable voltage control on the feeders downstream of the transformer regardless of variable electrical conditions due to fast variations in loads and distributed generation (DG). The decreased number of tap changes facilitates extending the service life of the tap changers and improves the regulation of voltage on electric distribution networks.

Figure 1:
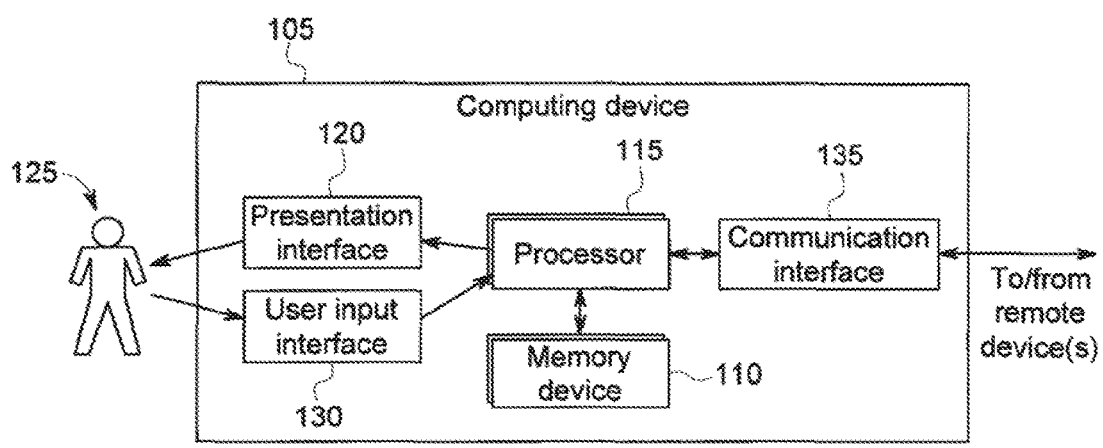
FIG. 1 is a block diagram of an exemplary computing device.

FIG. 1 is a block diagram of an exemplary computing device 105 that may be used to perform monitoring and/or control of an electric power distribution system and, more specifically, a tap changer device associated with a distribution transformer (neither shown in FIG. 1). Also, in the exemplary embodiment, computing device 105 monitors and/or controls any piece of equipment, any system, and any process associated with the electric power distribution system, e.g., without limitation, voltage regulators, at least a portion of distributed generation (DG), and monitoring devices (neither shown in FIG. 1). Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store operational measurements including, without limitation, real-time and historical transformer (high side and low side) and feeder voltage values, tap changes, and/or any other type data. Also, memory device 110 includes, without limitation, sufficient data, algorithms, and commands to facilitate monitoring and control of the components within the associated electric power distribution system.

In some embodiments, computing device 105 includes a presentation interface 120 coupled to processor 115. Presentation interface 120 presents information, such as a user interface and/or an alarm, to a user 125. In some embodiments, presentation interface 120 includes one or more display devices. In some embodiments, presentation interface 120 presents an alarm associated with the associated electric power distribution system being monitored and controlled, such as by using a human machine interface (HMI) (not shown in FIG. 1). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as a sensor or another computing device 105, and to perform input and output operations with respect to such devices while performing as an input channel. Communication interface 135 may receive data from and/or transmit data to one or more remote devices. For example, a communication interface 135 of one computing device 105 may transmit an alarm to the communication interface 135 of another computing device 105.

In the exemplary embodiment, control of a tap changer for a transformer (neither shown in FIG. 1) is performed with local control devices, i.e., a localized computing device 105. Alternatively, control of such tap changers is performed as a portion of a larger, more comprehensive system, as discussed further below.

Figure 2:
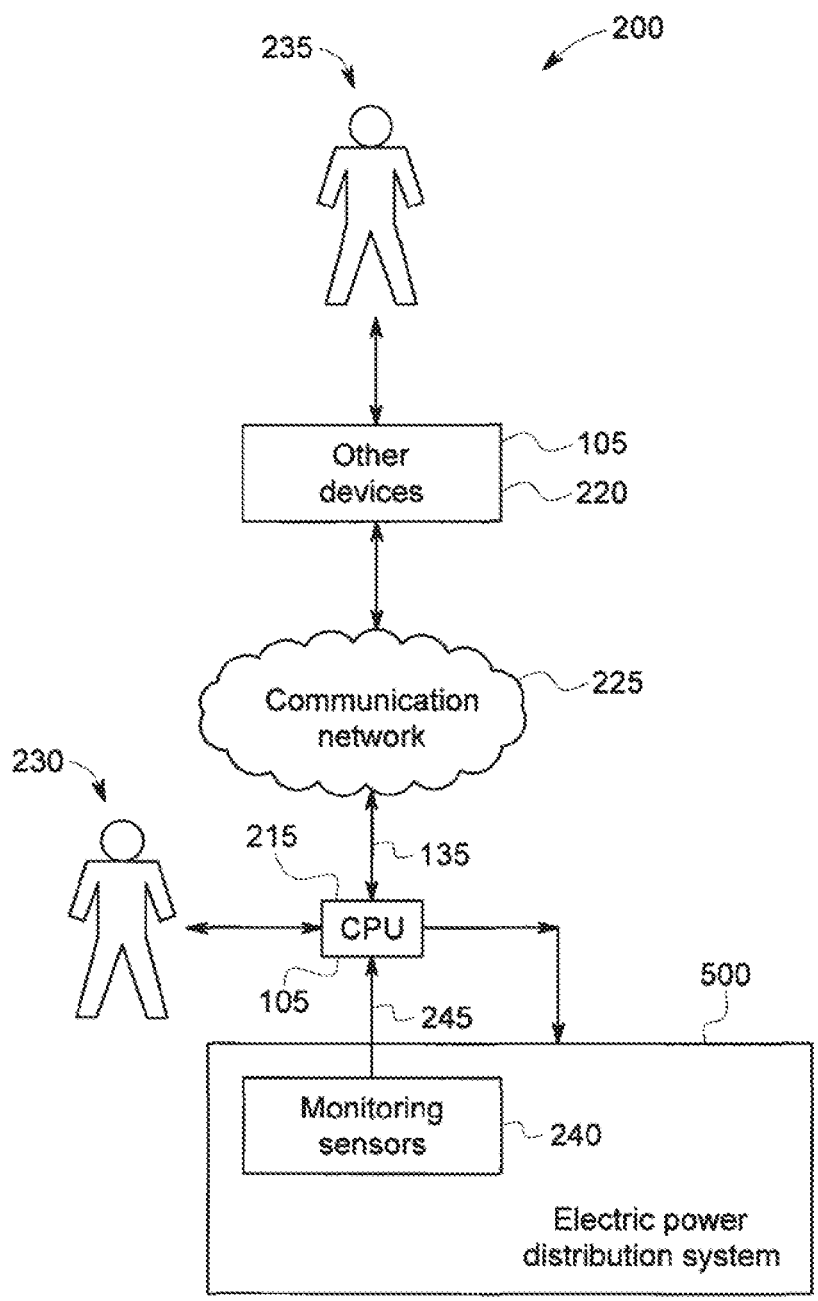
FIG. 2 is a block diagram of a portion of an exemplary monitoring and control system that may include the computing device shown in FIG. 1.

FIG. 2 is a block diagram of a portion of a monitoring and control system, i.e., a Supervisory Control and Data Acquisition (SCADA) system 200 that may be used to monitor and control at least a portion of an electric power distribution system 500. As used herein, the term "SCADA system" refers to any control and monitoring system that may monitor and control electric power distribution system 500 across multiple sites, remote sites, and large distances. SCADA system 200 includes at least one central processing unit (CPU) 215 configured to execute monitoring and control algorithms and monitoring and control logic. CPU 215 may be coupled to other devices 220 via a communication network 225. In some embodiments, CPU 215 is a computing device 105. In other embodiments, CPU 215 is a controller.

CPU 215 interacts with a first operator 230, e.g., without limitation, via user input interface 130 and/or presentation interface 120. In one embodiment, CPU 215 presents information about electric power distribution system 500, such as alarms, to operator 230. Other devices 220 interact with a second operator 235, e.g., without limitation, via user input interface 130 and/or presentation interface 120. For example, other devices 220 present alarms and/or other operational information to second operator 235. As used herein, the term "operator" includes any person in any capacity associated with operating and maintaining electric power distribution system 500, including, without limitation, shift operations personnel, maintenance technicians, and electric dispatch facility supervisors.

Electric power distribution system 500 includes one or more monitoring sensors 240 coupled to CPU 215 through at least one input channel 245. Monitoring sensors 240 collect operational measurements including, without limitation, AC voltages and currents generated within and transmitted through electric power distribution system 500. Monitoring sensors 240 repeatedly, e.g., periodically, continuously, and/or upon request, transmit operational measurement readings at the time of measurement. CPU 215 receives and processes the operational measurement readings. In one embodiment, such data may be transmitted across network 225 and may be accessed by any device capable of accessing network 225 including, without limitation, desktop computers, laptop computers, and personal digital assistants (PDAs) (neither shown).

While FIG. 2 describes an alternative embodiment, some components described for FIG. 2 may be used with the stand-alone computing device 105 (shown in FIG. 1), e.g., without limitation, monitoring sensors 240. As such, computing device 105 includes, without limitation, sufficient data, algorithms, and commands to independently facilitate voltage control of electric power distribution system 500 as described herein, thereby making SCADA system 200 and communications network 225 unnecessary.

Figure 3:
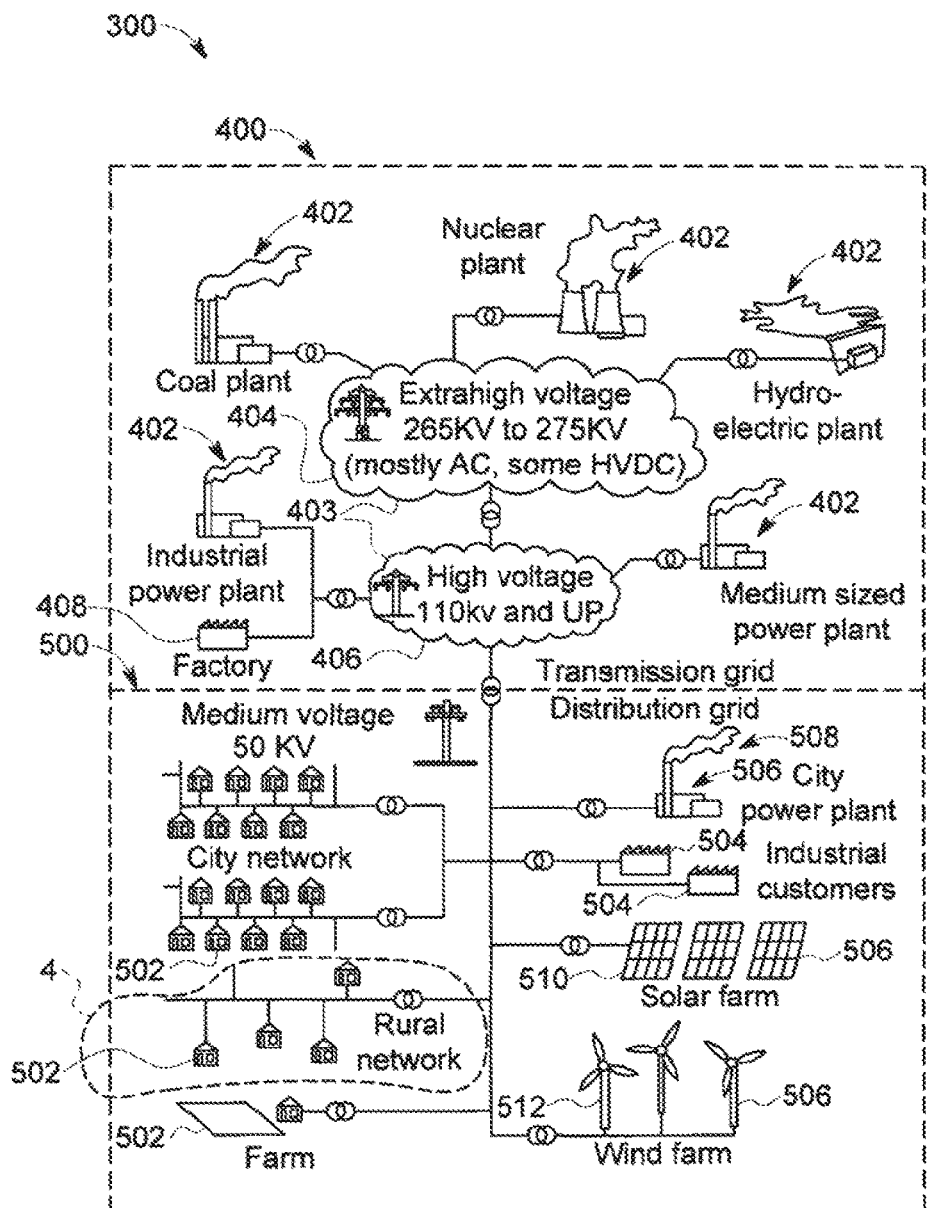
FIG. 3 is a general schematic diagram of an exemplary electric power network including both an exemplary transmission network and an exemplary electric power distribution system with distributed generation (DG)

FIG. 3 is a general schematic diagram of an exemplary electric power network 300. In general, electric power network 300 typically includes a generation and transmission portion 400 coupled to an exemplary electric power distribution system 500. Generation and transmission portion 400 includes a plurality of power plants 402 generating and transmitting electric power to a transmission grid 403, which includes an extra high voltage transmission grid 404 and a high voltage transmission grid 406 through which power is transmitted to electric power distribution system 500. In the exemplary embodiment, extra high voltage grid 404 includes voltages greater than approximately 265 kilo-Volts (kV) and high voltage transmission grid 406 includes voltages between approximately 110 kV and approximately 265 kV. Alternatively, extra high voltage grid 404 and high voltage transmission grid 406 have any voltages that enable operation of electric power distribution system 500 as described herein. Some electric power customers, such as power-intensive industrial facilities, e.g., and without limitation, factory 408, are coupled to high voltage transmission grid 406. Electric power network 300 may include, without limitation, any number, type and configuration of power plants 402, extra high voltage transmission grids 404, high voltage transmission grids 406, factories 408, and electric power distribution systems 500.

Also, in the exemplary embodiment, electric power distribution system 500 includes low wattage consumers 502 and industrial medium wattage consumers 504. Electric power distribution system 500 also includes distributed generation (DG) 506. Such DG 506 includes, without limitation, a city power plant 508, a solar farm 510, and a wind farm 512. While electric power distribution system 500 is shown with an exemplary number and type of distributed generators 506, electric power distribution system 500 may include any number and type of distributed generators 506, including, without limitation, individual diesel generators, micro-turbines, solar collector arrays, solar photovoltaic (PV) arrays, and wind turbines.

Figure 4:
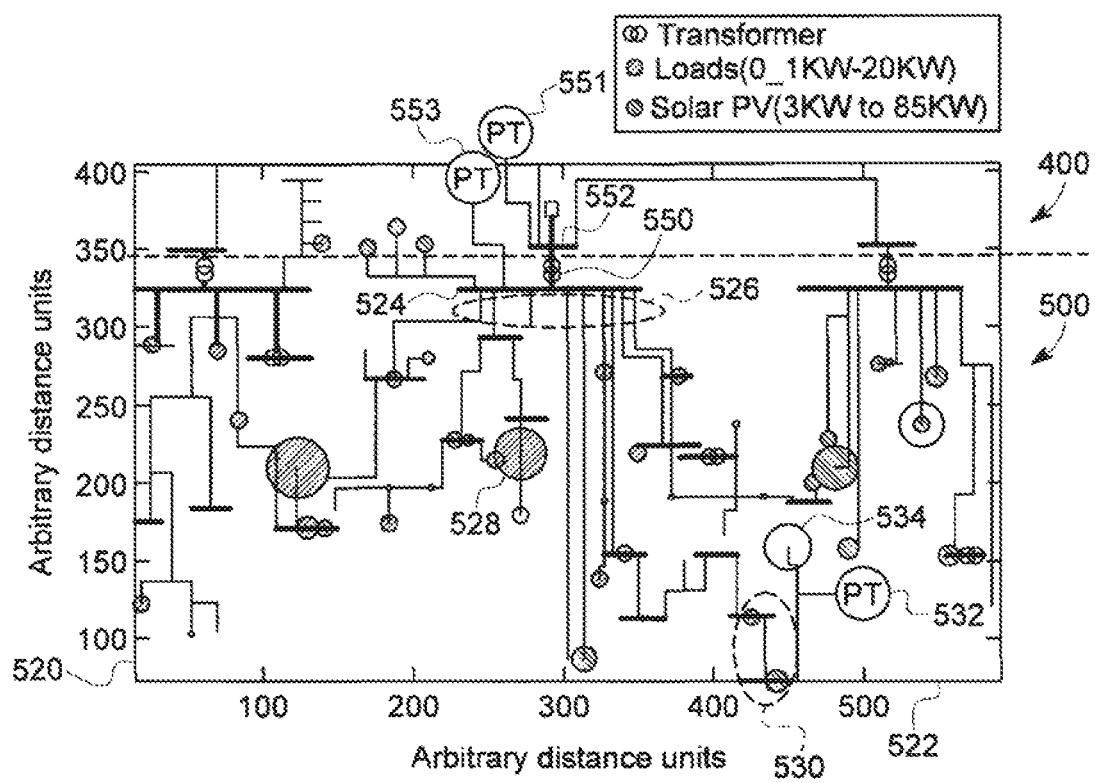
FIG. 4 is an expanded schematic diagram of a portion of the electric power distribution system shown in FIG. 3 and taken at area 4.

FIG. 4 is an expanded schematic diagram of a portion of electric power distribution system 500 taken at area 4 (shown in FIG. 3) that uses computing device 105 (shown in FIG. 1). A y-axis 520 and an x-axis 522 are labeled with distances in arbitrary units. Electric power distribution system 500 includes a low voltage feeder bus 524, hereon referred to as the head of the feeder 524. Head of the feeder 524 is coupled to a plurality of feeder line segments 526. Many of feeder line segments 526 include one or more distribution buses (not shown in FIG. 4) that include a plurality of loads 528 and solar PV arrays 530 that are both configured with various sizes. The larger loads 528 and PV arrays 530 are shown with larger-diameter circles. Loads 528 vary between 0.1 kilowatts (kW) and 20 kW. Solar PV arrays 530 vary between 3 kW and 85 kW. Alternatively, loads 528 and solar PV arrays 530 have any mix of ratings that enables operation of electric power distribution system 500 as described herein. In one embodiment, at least one potential transformer (PT) 532 may be coupled to a feeder end 534 to measure feeder voltage after most of the voltage drop is induced. PT 532 measures voltage at feeder end 534 and transmits signals representative of the voltage. Instrumentation such as PT 532 is typically not available at feeder ends such as feeder end 534. Electric power distribution system 500 may also include voltage regulators, capacitor banks, distributed generation in the form of diesel generators, and other devices (neither shown) typically used with distribution systems.

Electric power distribution system 500 further includes at least one medium voltage-to-low voltage (MV/LV) distribution transformer 550 coupled to a medium voltage bus 552, e.g., without limitation, 20 kV, and head of the feeder 524. In the exemplary embodiment, transformer 550 is rated for 630 kilo-Volt-Amperes (kVA). Alternatively, transformer 550 has any rating that enables operation of electric power distribution system 500 as described herein. Also, in the exemplary embodiment, transformer 550 is an OLTC transformer with a tap changer device (not shown in FIG. 4, and described further below). A PT 551 is coupled to medium voltage bus 552 proximate transformer 550 to measure voltage on bus 552 and transmit signals representative of the voltage on bus 552 to at least one of computing device 105 (shown in FIG. 1) and SCADA system 200. Similarly, a PT 553 is coupled to head of the feeder 524 proximate transformer 550 to measure voltage on head of the feeder 524 and transmit signals representative of the voltage on head of the feeder 524 to at least one of computing device 105 (shown in FIG. 1) and SCADA system 200. In at least some embodiments, a PT is used to measure voltage proximate the tap changer.

Figure 5:
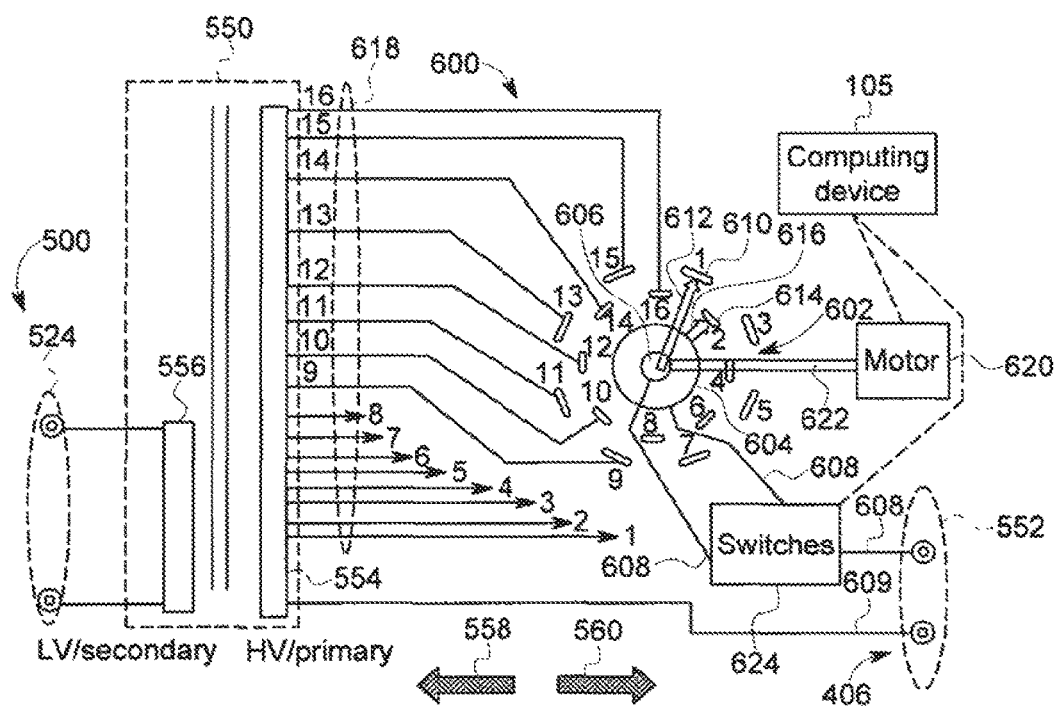
FIG. 5 is a schematic diagram of an exemplary tap changer device that may be used with the electric power distribution system shown in FIGS. 3 and 4.

FIG. 5 is a schematic diagram of an exemplary on-load tap changer 600 that may be used with electric power distribution system 500 (shown in FIGS. 3 and 4) and computing device 105 (shown in FIG. 1). In the exemplary embodiment, tap changer 600 is a rotary tap selector in-tank type with a make-before-break contactor configuration. Alternatively, tap changer 600 is any type of tap changer that enables operation of electric power distribution system 500 as described herein. OLTC distribution transformer 550 includes a plurality of medium voltage, i.e., primary windings 554 coupled to medium voltage bus 552 through tap changer 600. OLTC distribution transformer 550 also includes a plurality of low voltage, i.e., secondary windings 556 coupled to head of the feeder 524. In the exemplary embodiment, tap changer 600 is physically coupled to primary windings 554. Alternatively, tap changer 600 is physically coupled to secondary windings 556.

Electric power may be transmitted in both directions through transformer 550. Specifically, electric power is transmitted from primary windings 554 to secondary windings 556 when power drawn by loads 528 (shown in FIG. 4) is greater than power generation of the sum of operating DG downstream of transformer 550, e.g., solar PV arrays 530 (shown in FIG. 4), power plant 508, solar farm 510, and wind farm 512 (all three shown in FIG. 4), and any diesel generators and micro-turbines (neither shown). Under such conditions, electric power flows from primary windings 554 to secondary windings 556, i.e., from high voltage transmission grid 406 into electric power distribution system 500 as shown with forward arrow 558 and may be referred to as forward power flow or positive power flow. In contrast, if the DG downstream of transformer 550 is generating more power than is consumed downstream of transformer 550 by loads 528, electric power transmission is reversed and electric power flows from secondary windings 556 to primary windings 554, i.e., from electric power distribution system 500 into high voltage transmission grid 406 as shown with reverse arrow 560. This situation may be referred to as reverse power flow or negative power flow.

Tap changer 600 includes a rotary tap selector 602 that includes a first, or outer contact portion 604 and a second, or inner contact portion 606, both coupled to medium voltage bus 552 through a plurality of conduits 608. Windings 554 are coupled to medium voltage bus 552 through a conduit 609. Rotary tap selector 602 includes a plurality of radially outer notches 610 and a first notch selector arm 612 configured to couple with radially outer notches 610. Radially outer notches 610 are configured with odd numerals 1 through 15 corresponding to a plurality of odd numbered OLTC transformer taps 1 through 15 that are coupled to portions of primary windings 554 in incremental portions of windings 554. Rotary tap selector 602 also includes a plurality of radially inner notches 614 and a second notch selector arm 616 configured to couple with radially inner notches 614. Radially inner notches 614 are configured with even numerals 2 through 16 corresponding to a plurality of even numbered OLTC transformer taps 2 through 16 that are coupled to portions of primary windings 554 in incremental portions of windings 554. Odd numbered OLTC transformer taps 1 through 15 and even numbered OLTC transformer taps 2 through 16 define plurality of OLTC transformer taps 618.

Selection of taps 1 through 16 of plurality of OLTC transformer taps 618 regulates an inductive coupling between primary windings 554 and secondary windings 556 by selecting a tap 1 through 16 that provides a predetermined ratio of the number of primary windings 554 to the number of secondary windings 556. Such windings' ratio facilitates a predetermined primary-to-secondary voltage ratio. In the example shown in FIG. 6, the turns ratio increases with increasing the tap number from 1 through 16. The relationship of the number of turns and the voltages is shown as:

$$V_{IN}/V_{OUT}=T_1/T_2, \qquad \text{Equation (1)}$$

where $V_{IN}$ represents the inlet voltage, i.e., high voltage on primary windings 554, $V_{OUT}$ represents the outlet voltage, i.e., low voltage on secondary windings 556, $T_1$ represents the number of winding turns associated with primary windings 554, and $T_2$ represents the number of winding turns associated with secondary windings 556.

Tap changer 600 also includes a motor 620 coupled to a tap selection arm 622 that is configured to selectively move each of first notch selector arm 612 and second notch selector arm 616 to a predetermined odd notch 610 and even notch 614, respectively. Tap changer 600 further includes at least one switch 624, e.g., without limitation, a diverter switch, that operates in conjunction with motor 620 to select which of the 16 taps is in service. Tap changer 600 also includes additional equipment, e.g., and without limitation, transition/limiting resistors. Computing device 105 is coupled to motor 620 and switches 624 to operate tap changer 600 as described further below.

In operation, one of 1 through 16 of plurality of OLTC transformer taps 618 is selected to provide a first predetermined ratio of primary windings 554 to secondary windings 556. First notch selector arm 612 is positioned to one of radially outer notches 610 oddly numbered 1 through 15 and second notch selector arm 616 is positioned to one of radially inner notches 614 evenly numbered 2 through 16. However, switches 624 select only one of first notch selector arm 612 and second notch selector arm 616 at any one time. Therefore, commands from computing device 105 selectively reposition one of first notch selector arm 612 and second notch selector arm 616 through operation of motor 620 and tap selection arm 622, i.e., the arm 612 or 616 that is not currently associated with the in-service tap. Only numerically adjacent taps can be selected for the next move, e.g., first notch selector arm 612 can shift from notch 1 to notch 3, but not from notch 1 to notch 5 or from notch 1 to notch 15. Once the desired tap notch is selected, computing device 105 operates switches 624 to select the previously unselected notch selector arm 612 or 616 in the new tap position and then de-select the previously selected arm 612 and 616 in a make-before-break manner, thereby establishing a second predetermined ratio of primary windings 554 to secondary windings 556.

Figure 6:
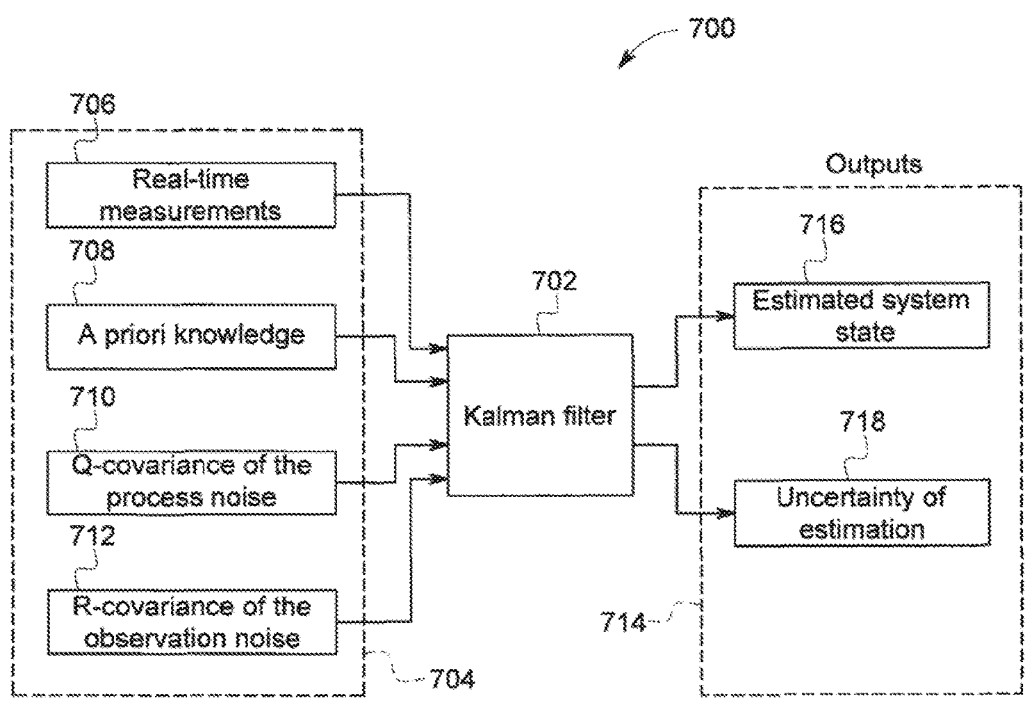
FIG. 6 is a block diagram of an exemplary system state estimation system that may be used with the monitoring and control system shown in FIG. 2.

FIG. 6 is a block diagram of an exemplary system state estimation system 700 that may be used with a monitoring and control system, i.e., SCADA system 200 (shown in FIG. 2) used to monitor and control at least a portion of electric power distribution system 500 (shown in FIG. 5). In the exemplary embodiment, the grid voltages downstream of OLTC transformer 550 (shown in FIGS. 4 and 5) are estimated using a mathematical estimation technique, such as, and without limitation, a Kalman Filter 702 that is resident within the implementation of system state estimation system 700. Alternatively, any mathematical estimation technique that enables operation of system state estimation system 700 as described herein is used. The estimation method implemented in system state estimation system 700 is a linear load flow problem with a constant current (or power) formulation as implemented in the linear estimator of Kalman Filter 702.

System state estimation system 700 also includes an input module 704 that includes a plurality of input channels. Input module 704 includes a first input channel 706 that receives real-time measurements such as current (or power) and voltage measurements proximate secondary windings 556 (shown in FIG. 5) of OLTC transformer 550 using current measurement and voltage measurement devices (not shown) as part of an instrumentation suite that includes monitoring sensors 240 (shown in FIG. 2). Such real-time transformer current and voltage measurements facilitate determinations of the magnitude and direction of power transmission through OLTC transformer 550.

Input module 704 also includes a second input channel 708 that receives a priori knowledge from a number of sources including, without limitation, assumptions of average bus current for each bus downstream of OLTC transformer 550 as a function of measured current through transformer 550. As used herein, the term "a priori" refers to those values relating to, or denoting, reasoning, knowledge, and data generated from theoretical deduction as well as from purely empirical observation or experience. Also, such a priori sources include factors relating to the time-of-day, e.g., estimated load values and/or historically recorded load values on each bus and clear day solar generation curves at least partially representative of assumed real-time PV power generation on each bus as a function of the time-of-day (each discussed further below). Further, such a priori sources include assumptions about load consumption, i.e., average load power consumption.

Input module 704 further includes a third input channel 710 that receives covariance data (Q) of process noise within electric power distribution system 500, where covariance Q models the likelihood that the current in a given bus will change from one interval step to another to facilitate uncertainty evaluations. Input module 704 also includes a fourth input channel 712 that receives covariance data (R) of observed variables to model uncertainty of such observed variables, including, without limitation, the noise expected from the real-time measurements from SCADA system 200 of voltage and current at OLTC transformer 550. Covariance data (R) also includes the uncertainty around the a priori knowledge collected on the values of the individual bus currents within electric power distribution system 500 downstream of OLTC transformer 550.

System state estimation system 700 further includes an output module 714 that includes a plurality of output channels. Output module 714 includes a first output channel 716 that transmits estimated system state conditions, i.e., estimated bus currents for each of the associated bus under consideration to a processor, e.g., computing device 105 (shown in FIG. 5) where the current estimates are converted to voltage estimates for each bus. In the exemplary embodiment, the estimated values for the critical voltage at the end of the associated feeder are used to generate commands for tap changer 600. Output module 714 also includes a second output channel 718 that transmits residual uncertainty of the bus voltages. Such a value is a function of the specific admittance, i.e., the inverse of impedance, of the associated portion of electric power distribution system 500 and the smaller the uncertainty in the a priori currents, the smaller the uncertainty in the critical voltage estimation.

FIG. 7 is a schematic diagram of an exemplary plurality of distribution buses in a first configuration that are in electric power distribution system 500. FIG. 8 is an exemplary graphical representation of a priori bus currents and the associated uncertainty values for the plurality of distribution buses (shown in FIG. 7) for determining the a priori bus currents and the associated uncertainty values. FIGS. 7 and 8 are provided to facilitate describing the derivation of the logic and algorithms used to determine the a priori bus currents and voltages and to provide two relatively simple examples.

As described above, electric power distribution system 500 includes OLTC distribution transformer 550 coupled to medium voltage bus 552 (sometimes referred to as the slack bus) and head of the feeder 524. In the exemplary embodiment, PT 551 is coupled to medium voltage bus 552 proximate transformer 550 to measure voltage on bus 552 and transmit signals representative of the reference voltage ($V_{ref}$) on bus 552 to at least one of computing device 105 (shown in FIG. 1) of SCADA system 200 (shown in FIG. 2). A current transformer (CT) 730 is coupled to medium voltage bus 552 to measure current on bus 552 and transmit signals $i_1(t)$ representative of the current on the primary side of transformer 550 to computing device 105. Reference voltage $v_{ref}$ is assumed to be substantially constant and slack bus current $i_1(t)$ varies with load and DG generation downstream of transformer 550. In the exemplary embodiment, DG generation is assumed to be substantially PV generation.

Also, in the exemplary embodiment, electric power distribution system 500 includes head of the feeder 524 coupled to feeder line segment 526 that includes a plurality of distribution buses that include a plurality of loads 528 and a solar PV array 530 that are configured with various sizes. In the exemplary embodiment, there are five distribution buses, i.e., Bus 2, Bus 3, Bus 4, Bus 5, and Bus 6. Medium voltage bus 552, i.e., slack bus 552 is considered to be Bus 1. Only Bus 2 and Bus 3 are shown with loads 528 and only Bus 6 is shown with a solar PV array 530. Specifically, Bus 2 includes loads 734 and Bus 2 can absorb at most 0.01 kiloamperes (kA) of current, Bus 3 includes loads 736 and Bus 3 can absorb at most 0.08 kA of current, and Bus 6 includes solar PV array 738, where PV generator 738 can produce at most a current value of −0.03 kA. There are no loads or DG on Buses 4 and 5.

Further, in the exemplary embodiment, PT 553 is coupled to head of the feeder 524 proximate transformer 550 to measure voltage on head of the feeder 524 and transmit signals $v_{TC}(t)$ representative of the voltage on head of the feeder 524 to computing device 105. A current transformer (CT) 732 is coupled to head of the feeder 524 proximate transformer 550 to measure current on head of the feeder 524 and transmit signals $i_{TC}(t)$ representative of the current on the secondary side of transformer 550 to computing device 105. There is substantially no voltage and current measurement instrumentation downstream of head of the feeder 524. Therefore, the voltage and current at the $i^{th}$ bus, i.e., $v_i(t)$ and $i_i(t)$, respectively, are determined, i.e., inferred using the methods described below.

The voltages and currents at the $i^{th}$ bus, i.e., $v_i(t)$ and $i_i(t)$, respectively, are determined, i.e., inferred using the methods, logic, and algorithms described below. A complex voltage value $v_U$ at time t represents an N−1×1 matrix of unknown voltage values $v_2(t), v_3(t), \ldots v_N(t)$, where N is the number identifier for the largest bus number of the buses under consideration, and where, in the exemplary embodiment, this value is 6, representative of Bus 6 at feeder end 534 (shown in FIG. 7). The unknown voltage values are collected in the N−1×1 vector:

$$v_U(t) = \begin{bmatrix} v_2(t) \\ \vdots \\ v_N(t) \end{bmatrix}. \quad \text{Equation (2)}$$

Medium voltage bus 552, i.e., slack bus 552 on the primary side of tap changing transformer 550 is considered to be Bus 1. Its voltage is constant and known and referred to as reference voltage $v_{ref}$ and it is written as:

$$v_c = v_{ref}. \quad \text{Equation (3)}$$

The voltage at the secondary side of transformer 550 is equal to the voltage at Bus 2 and is therefore given by:

$$v_{TC}(t) = v_2(t) \quad \text{Equation (4)}$$

The current transmitted through transformer 550 is found by summation of all bus currents, i.e., by:

$$i_{TC}(t) = \sum_{i=2}^{N} i_i(t). \quad \text{Equation (5)}$$

According to Ohm's Law, the relationships between voltage and current at the buses and at transformer 550 can be written as:

$$\begin{bmatrix} i_U(t) \\ i_C(t) \end{bmatrix} = \begin{bmatrix} y_{U,C} & y_{U,U}^T \\ y_{C,C}^T & Y_{C,U} \end{bmatrix} \begin{bmatrix} v_C \\ v_U(t) \end{bmatrix}, \quad \text{Equation (6)}$$

where $i_U(t) = i_1(t)$, i.e., the current on slack bus 552. The matrices $Y_{C,U}$ represent the impedance matrices between the different elements of the network. The block matrix $y_{U,C}$ has dimension 1×1 and it has been denoted with a lower letter for emphasizing that it is a scalar. The block matrices $y_{U,U}^T$ and $y_{C,C}^T$ have dimensions N−1×1 and 1×N−1 respectively. Those variables are denoted with the bold lower letter y for emphasizing they are vectors. Vectors are considered column-wise. The transposed symbol is used for representing the column vector $y_{U,U}^T$ as a row vector.

For enhanced tap changer operation, the currently prevailing voltage level in the network is determined with only the voltage and current measurements at transformer 550 provided. Therefore, we are interested in the relationship between $v_U$ and $i_C$, where $v_U$ is solved for in order to determine the critical voltage for regulation. From equations (3) and (6) and assuming $Y_{C,U}$ is invertible:

$$v_U(t) = Bi_C(t) + Av_{ref}, \quad \text{Equation (7)}$$

where $$B = (Y_{C,U})^{-1}, \quad \text{Equation (8)}$$

and $$A = (-Y_{C,U})^{-1} y_{C,C}^T. \quad \text{Equation (9)}$$

Therefore, the following system of equations is obtained from equations (5) through (9):

$$\begin{cases} v_U(t) = Bi_C(t) + Av_{ref} \\ i_{TC}(t) = 1^T i_C(t) \end{cases}, \quad \text{Equation (10)}$$

where I is a vector of appropriate dimension whose elements are all 1 and the measured voltage at transformer 550 is:

$$v_{TC} = v_{U1} = v_2. \quad \text{Equation (11)}$$

The following control approach uses a discrete-time controller, e.g., CPU 215 and computing device 105 (both shown in FIG. 2) with a sampling interval Δt. The $k^{th}$ sampling interval is defined as:

$$[t_0 + k\Delta t, t_0 + (k+1)\Delta t], \quad \text{Equation (12)}$$

where $t_0$ is the time instant where the sampling began. Given a continuous-time variable x(t), the sampled version of x(t) is denoted with x(k), i.e., for all k, $x(k) = x(t_0 + k\Delta t)$.

At every interval k an appropriate tap position is selected so that the voltage of every bus in the network is bounded within the statutory limits. The critical bus is defined as that bus with the greatest voltage rise or drop from the feeder head, where the greatest potential for exceedance of voltage parameters is present, i.e., potential violations, e.g., voltage exceedences, of established voltage limits may occur. As described above, the established voltage limits for the critical buses at least partially define the permissible voltage ranges/bands at the OLTC.

At run-time, that is, after $t = t_0$, the controller measures the value of $v_{TC}(k)$ and $i_{TC}(k)$, but it has no information about the voltage values or current values at the different buses, i.e., Buses 3-6. However, in order to select the correct tap position with tap selector 602 (shown in FIG. 5), information on all bus voltages, i.e., $v_U(k)$ or at least the critical bus voltage is required. The system in equation (10) relates $v_{TC}(k)$ and $i_{TC}(k)$ to $v_U(k)$ through a set of linear equations. In principle, such a system is well-suited for a Kalman Filter approach. However, the values of currents at the buses cannot be uniquely derived from equation (10) based on $v_{TC}(k)$ and $i_{TC}(k)$ only because the system in equation (10) is characterized by N linear equations, where there are two known variables. As such, when N is greater than 3, this information is not sufficient to uniquely identify the values of the current (or voltages) of the buses.

To overcome the lack of complete observability of the system, the uncertainty of the values of the a priori currents can be reduced by exploiting knowledge about maximum and minimum bus current values. For example, the limits on bus currents may be set to the maximum and minimum admissible current values to establish the possible current range for each bus based on the physical limits of the connected loads and generation units. As such, the physical limits with respect to the bus currents are used to construct the a priori currents. Such a priori currents are genrated with the knowledge that actual values of the bus currents will reach inside the established possible range and the a priori information is expressed through a probability measure, i.e., more specifically, a Gaussian distribution is generated due to Kalman Filter 702 (shown in FIG. 6). Given such a Gaussian distribution, the a priori current is set at the midpoint of the established possible range. The uncertainty around this a priori value is derived from the width of the possible current range.

The calculated bus currents are modeled using the first dynamic equation of equation (13) (above the dashed line shown in FIG. 10) used by Kalman Filter 702 measurements w(k) weights the likelihood that sudden variations in the measured variables are due to sudden changes in the current on the buses, or to large errors of the measurements (w(k)). Rewriting equation (10), adding the a priori currents ($i^0(k)$), and considering the uncertainty connected with the real and deduced measurements (v(k)), the second equation of system (13) (below the dashed line shown in FIG. 10) is derived.
where the identity matrix I is shown in the dashed box. The vectors w(k) and v(k) represent independent process noises assumed to be drawn from a Gaussian distribution with zero mean and covariance matrices Q(k) and R(k), respectively (both shown in FIG. 6). The vector $i^0(k)$ represents the a priori knowledge of the values of the bus currents. The value of this vector can be computed off-line based on using additional knowledge like time of the day (discussed further below).

The covariance of vector w(k), i.e., Q(k), models the likelihood that the current in a given bus will change from one step k to another. The covariance of the vector v(k), i.e., R(k), models the uncertainty around the variables $v_{TC}(k)$, $i_{TC}(k)$ and $i^0(k)$. The first two elements of v(k) represent the amount of noise we expect from the actual measurements of $v_{TC}(k)$ and $i_{TC}(k)$. The other elements of v(k) model the expected accuracy of the a priori values $i^0(k)$ (discussed further below).

With the addition of a priori current values as "virtual" or "fake" measured variables, the system described by equation (13) is now observable and filters such as Kalman Filter 702 may be used to estimate the current at every bus. Hence, as an output, Kalman Filter 702 will produce an estimate for all bus currents as well as an associated covariance or uncertainty.

Given an estimated bus current value $\hat{i}_C(k)$ with covariance P(k), the voltage at every bus can be estimated as:

$$\hat{v}_U(k) = B\hat{i}_C(k) + Av_{ref},$$ Equation (15)

and the uncertainty of each voltage estimation is given by:

$$P_{v_U}(k) = BP(k)B^T,$$ Equation (16)

where B is defined by equation (8) and A is defined by equation (9).

The voltage estimation uncertainty described by $P_{v_U}(k)$ in equation (16), and as determined through second output channel 718, represents the residual uncertainty on the bus voltages after the current at transformer 550 has been measured and the estimation of step k has been completed. The bus voltages and thus the residual uncertainty on the bus voltages is a function of the specific admittance of the network. This implies that given the same uncertainty on the a priori current, a different uncertainty on the bus voltage can be obtained on different grids. The bus voltages are ontained as a function of the estimated bus currents and the network admittance (see Equation (15)). As such, the smaller the uncertainty in the a priori currents, the smaller the uncertainty in the estimation.

As described above, the possible values of the a priori currents are bounded by upper and lower limits for each bus. These limits could be given by maximum and minimum admissible currents or using physical and meteorological limits (both described further below). $\underline{i}_C(k)$ represents the lower bound for $i_C(k)$ and $\overline{i}_C(k)$ represents the upper bound. At every interval k the following holds true:

$$\underline{i}_C(k) \leq i_C(k) \leq \overline{i}_C(k).$$ Equation (17)

The value of the a priori current vector $i_C^0(k)$ is defined as the mean value between the two limiting vectors, i.e.:

$$i_C^0(k) = \underline{i}_C(k) + \tfrac{1}{2}(\underline{i}_C(k) + \overline{i}_C(k)).$$ Equation (18)

Equation (17) implies a bounded uniform distribution of the bus currents. However, the Kalman Filter approach inherently assumes an unbounded Gaussian distribution. Hence, the current vector given by equation (18) is defined as the mean of the Gaussian distribution with covariance matrix R(k) representing the uncertainty interval surrounding the a priori current vector. This uncertainty interval is limited by the lower bound for $i_C(k)$, i.e., $\underline{i}_C(k)$ and $\overline{i}_C(k)$, which denotes the upper bound of $i_C(k)$. To this effect, the $i^{th}$ bus current is subject to an uncertainty defined by:

$$R_{i+1,i+1}(k) = \left[\left(\frac{1}{X}\right)\frac{(\overline{i}_C(k) - \underline{i}_C(k))}{2}\right]^2,$$ Equation (19)

where $R_{i+1,i+1}(k)$ represents the diagonal elements of covariance matrix R. The $$\left(\frac{1}{X}\right)$$

factor relates the bounded uniform distribution of the bus currents with the unbounded Gaussian distribution. More specifically, it is assumed that $X\sigma$ corresponds to half of the uncertainty interval given by:

$$X\sigma = \frac{\overline{i}_C - \underline{i}_C}{2}.$$ Equation (20)

Possible values for X are 2 or 3, whereas other factors can be used as well. Compared to X=3, a value of X=2 leads to a wider Gaussian curve, more closely resembling a uniform distribution. Furthermore, values of $i_C$ close to the limits, i.e., approaching $\overline{i}_C$ and $\underline{i}_C$, are more likely in the latter than in the former case. Therefore, a value of X=2 will be used hereon. Furthermore, non-diagonal elements can be included in the matrix R for modeling correlation among currents in the bus. This can be done for PV currents, for instance, where, for simplicity, a correlation of 1 may be assumed. A correlation of 1 implies that power generated by PV panels close to each other follow the same pattern. Independently from the specific distribution network, a reduction on the uncertainty of the a priori current typically yields a reduction of the uncertainty of the estimated voltage at the buses. Approaches for reducing the uncertainty of the a priori current by considering physical bounds on the currents and additional information gathered at run-time are discussed further below.

As described above, FIG. 8 is an exemplary graphical representation of a priori bus currents and the associated uncertainty values for the plurality of distribution buses, i.e., Buses 2, 3, and 6 (shown in FIG. 7) for determining the a priori bus currents and the associated uncertainty values. Also, as described above, the interval for the a priori current vector can be defined based on physical limits imposed by the load or installed PV capacity at different buses, or by the physical limits of the network in allowing certain current flows. In addition, the uncertainty on the currents at Buses 2 through 6 can be further limited based on the values measured at transformer 550.

In a first example, the current $i_{TC}(k)$ is deterministic and not affected by noise. In this first example, and referring to FIG. 7, loads 734 and 736 are only installed on Bus 2 and Bus 3, respectively. PV generator 738 is coupled to Bus 6. Loads are characterized by positive current values and PV generation is characterized by negative current values. In this example, $i_2(k) \geq 0$, $i_3(k) \geq 0$, $i_4(k)=0$, $i_5(k)=0$, and $i_6(k) \leq 0$. The load on Bus 2 can absorb at most 0.01 kiloamperes (kA) of current and load on bus 3 can absorb at most 0.08 kA of current. PV generator 738 can produce at most a current value of −0.03 kA. The measured real-time current at transformer 550 $i_{TC}(k)$ is −0.03 kA. Due to the constraints on the current, the only admissible combination of currents is $i_1(k)=0$, $i_2(k)=0$, $i_6(k)=-0.03$ kA. This derived current allocation is unique and there is no uncertainty around the estimated currents.

FIG. 8 includes a first graph 802 representative of inferred bus currents as a function of measured current at transformer 550. Graph 802 includes a y-axis 804 representative of the a priori current vector $i_C^0(k)$ as deduced by system state estimation system 700 extending from −0.04 kA to 0.08 kA in increments of 0.02 kA. Graph 802 also includes an x-axis 806 representative of the measured current $i_{TC}(k)$ at transformer 550 extending from −0.04 kA to 0.1 kA in increments of 0.02 kA. Graph 802 further includes a Bus 2 curve 808, a Bus 3 curve 810, and a Bus 6 curve 812. Buses 4 and 5 have defined current values of 0 kA and do not have curves.

FIG. 8 also includes a second graph 822 representative of inferred uncertainty of the inferred bus currents as a function of measured current at transformer 550. Graph 822 includes a y-axis 824 representative of the uncertainty R(k), as deduced by system state estimation system 700, of the priori current vectors $i_C^0(k)$ (shown in graph 802). Y-axis 824 extends from 0 kA to 0.04 kA in increments of 0.005 kA. Graph 822 also includes an x-axis 826 representative of the measured current $i_{TC}(k)$ at transformer 550 extending from −0.04 kA to 0.1 kA in increments of 0.02 kA. X-axis 826 is colinear with x-axis 806. Graph 822 further includes a Bus 2 curve 828, a Bus 3 curve 830, and a Bus 6 curve 832. Buses 4 and 5 have defined current values of 0 kA and do not have curves. Graphs 802 and 822 also include dashed lines 836 and 838, respectively, representative of the measured real-time current at transformer 550 $i_{TC}(k)$ of −0.03 kA. Curves 808, 810, and 812 indicate $i_1(k)=0$, $i_2(k)=0$, $i_6(k)=-0.03$ kA, respectively, and curves 828, 830, and 832 indicate uncertainties of 0. Therefore, the deduced Bus 6 current value of −0.03 kA is used as a real-time "virtual" or "fake" measured current equivalent to similarly deduce the associated critical voltage on Bus 6 through a linear calculation based on the known system admittance and then use that real-time deduced critical voltage as an input to determine the appropriate tap position.

In a second example, the current $i_{TC}(k)$ is deterministic and not affected by noise, similar to the first example. In this second example, and again referring to FIG. 7, loads are installed on Bus 2 and Bus 3 only. PV generator 738 is coupled to Bus 6. Loads are characterized by positive current values and PV generation is characterized by negative current values. In this example, $i_2(k) \geq 0$, $i_3(k) \geq 0$, $i_4(k)=0$, $i_5(k)=0$, and $i_6(k) \leq 0$. The load on Bus 2 can absorb at most 0.01 kA of current and load on Bus 3 can absorb at most 0.08 kA of current. PV generator 738 can produce at most a current value of −0.03 kA. The measured real-time current at transformer 550 $i_{TC}(k)$ is 0.04 kA. In this case, while it is clear that Bus 3 is consuming some current, however, the exact value of current consumption is unknown, but since there is at least some current consumption, the range of admissible values for $i_3(k)$ is smaller than the original interval of [0(kA), 0.08(kA)].

Given a certain value of measured real-time current at transformer 550, the minimum and maximum possible current values for each bus are determined. This problem is formulated as two separate linear optimization problems. The minimum current at a bus j is written as:

$$\min_{i_C(k)} \; i_j(k) \quad \text{Equation (21)}$$

$$\underline{i}_C \leq i_C(k) \leq \overline{i}_C$$

$$1^{ii} i_C(k) = i_{TC}(k).$$

Similarly, the maximum allowed current at bus i can be written as:

$$\min_{i_C(k)} \; -i_j(k) \quad \text{Equation (22)}$$

$$\underline{i}_C \leq i_C(k) \leq \overline{i}_C$$

$$1^T i_C(k) = i_{TC}(k).$$

This optimization routine yields $\underline{i}_C$ and $\overline{i}_C$ dependent on $i_{TC}$. Substituting this into equations (18) and (19) gives $i_C^0$ and the covariance matrix R. The resulting a priori values $i_C^0$ and their associated uncertainties as a function of $i_{TC}$ for the network are shown by dashed lines 846 and 848, respectively, in FIG. 8. For this second example, a measured $i_{TC}$ of 0.04 kA leads to a priori currents $i_C^0$ of roughly 0.005 kA, 0.05 kA, and −0.015 kA for Buses 2, 3 and 6, respectively. Also, for this second example, these currents are associated with uncertainties of different weights, i.e. 0.01 kA, 0.04 kA, and 0.03 kA for Buses 2, 3, and 6 respectively. Thus, for a measured $i_{TC}$ of 0.04 kA, the current of Bus 3 can be in the range of $i_C^0$ plus/minus half the corresponding uncertainty, i.e., 0.05 kA±[(0.04 kA)/2]. Therefore, for Bus 3 and a measured $i_{TC}$ of 0.04 kA, for instance, the introduction of the $i_{TC}$ dependency results in a reduction of the possible interval size for the a priori currents from [0 kA, 0.08 kA] without $i_{TC}$ dependency to [0.03 kA, 0.07 kA] with $i_{TC}$ dependency. Therefore, the reduced current interval that includes the uncertainty of the estimations for the buses, in conjunction with the known system admittance, facilitates a relatively wider voltage bandwidth for control of OLTC transformer 550, which in turn leads to less tap changing operations.

The examples described in FIGS. 7 and 8 above describe defining a permissible voltage range, i.e., bandwidth for on-load tap changer transformer 550 as a function of calculated values of current transmitted through each of Buses 2 through 6. Alternatively, a permissible voltage range for on-load tap changer transformer 550 is regulated as a function of calculated values of power transmitted through each of Buses 2 through 6.

FIG. 9 is an exemplary graphical representation 950 of a clear day curve 952 and a measured PV profile 954 for a cloudy summer day that may be used for the plurality of distribution buses, i.e., Buses 2 through 6 (shown in FIG. 7) for determining the a priori bus currents and the associated uncertainty values. Graph 950 includes a y-axis 956 representative of PV power per unit (pu) extending from 0.0 pu to 1.0 pu in increments of 0.1 pu. Graph 950 also includes an x-axis 958 representative of time in units of hours extending from 00:00 (midnight local) to 00:00 (midnight local) for a 24-hour day in increments of 3 hours.

For this example, PV profile 954 of a cloudy day in summer as depicted in FIG. 9 was used. Although the a priori uncertainty is limited by introducing the $i_{TC}$ dependency, the uncertainty in the estimation is still quite large throughout the entire day due to the variability of sunlight. Specifically, for PV panels, such as solar PV array 738, it is possible to further limit the a priori uncertainties. For example, where at a certain bus only a PV generator is connected and in this case the current is known to always be flowing out of the PV generator, the value of PV power generation will be 0 at night, and the maximum production per day will be bounded by the installed PV capacity and by the sun position. This information yields time varying bounds on the current of that bus which can be used to better identify suitable values for the covariance matrix R and the expected value of $i^o(k)$.

In general, the respective time varying bounds for each bus current (or power) can be determined based on the so called clear day curve and the maximum rating of the PV panel. Both of these information elements are assumed to be known and not affected by uncertainty. The clear day curve limits a PV plant's power generation capabilities. This curve can be found for all PV plants for every day of a year as a function of their geographical position, inclination, PV power rating, amongst others. Hence, in addition to the $i_{TC}$ dependency, a third time dependent dimension is introduced. An example of such a clear day curve 952 in comparison to a PV profile 954 for a cloudy summer day is shown in FIG. 9. The generated PV power shown in curve 954 is typically below the limit given by the clear day curve 952.

The time dependency introduced by clear day curve 952 will essentially change the values of $[\underline{i}_C, \bar{i}_C]$ in equations (21) and (22). In summer, on the day when irradiation reaches the highest values and during noontime, when the sun position is the highest, maximum PV power generation is possible. At this point, the curves will be exactly the same as the curves shown in FIG. 8. However, in actuality, these curves are different for each moment of the day, as well as each day of the year.

The time and $i_{TC}$ dependent a priori curves (not shown) for the a priori current and the associated uncertainty of the PV plant connected to Bus 6 around noontime on a sunny day indicate almost maximum PV power generation to be possible according to clear day curve 952 depicted in FIG. 9. Furthermore, the interval size for the PV plant's a priori current is further reduced. This effect is particularly apparent in the morning and during the night. For instance, referring to FIG. 7, when measuring a current of $i_{TC}$=0.04 kA early in the morning at 04:00 AM, a priori PV current is 0 kA with no uncertainty. The solely $i_{TC}$ dependent a priori current interval is found to be roughly [0 kA, 0.03 kA], where the a priori current of about −0.015 kA (referring to FIG. 8) is associated with an uncertainty of approximately 0.03 kA. Therefore, the interval size for the a priori current was reduced from 0.03 kA to zero. In contrast, the effect of this time dependency during noontime indicates the estimation uncertainty is not much reduced. This effect is expected, since PV generation could be close to its maximum during this time of the day making the a priori information with time dependency very similar to only $i_{TC}$ dependent a priori currents. However, as described above, the uncertainty of the a priori values, and thus the uncertainty of the estimation, is greatly reduced in the early morning and during the night.

In some embodiments, system state estimation system 700 is further configured to generate first estimations of voltages for each of Buses 2 through 6. These first voltage estimates are substantially based on measured current transmission through OLTC transformer 550. In addition, these first voltage estimates assume the worst case for each measured current or power flow at OLTC transformer 550 and are based on the assumption of worst case voltage drops and voltage rises in the associated feeders. For example, even at midnight, a worst case voltage rise of the largest PV power station is assumed. These worst case assumptions limit the range of the permissible voltage bandwidth at OLTC transformer 550, which may lead to unnecessary tap changing operations to facilitate maintaining the voltages at the remote feeder ends, i.e., the critical buses with a satisfactory margin to equipment parameters and/or regulatory requirements. In contrast, system state estimation system 700 is further configured to generate second estimations of voltages for each of Buses 2 through 6 also based on the measured current transmission through OLTC transformer 550 as well as the stochastic filtering technique using, for example, and without limitation, a Kalman Filter.

System state estimation system 700 is further configured to compare the first voltage estimations with the second voltage estimations. If the second voltage estimation provides a more optimistic estimation of the voltages for each of Buses 2 through 6, the limits for the permissible voltage bandwidth at OLTC transformer 550 are wider than would be otherwise if the worst case assumptions were used, thereby decreasing the number of unnecessary tap changing operations. Alternatively, if the second voltage estimation provides a less optimistic estimation of the voltages for each of Buses 2 through 6, i.e., the second voltage estimations are worse than the first voltage estimations based on the worst case assumptions, the limits for the permissible voltage bandwidth at OLTC transformer 550 are generated to be consistent with the first voltage estimations, i.e., the worst case.

The above-described control schemes for the tap changers embedded within the on-load tap changing (OLTC) transformers within electric power distribution systems, as described herein, overcome a number of deficiencies of known control systems and provide a cost-effective method for regulating voltage on such distribution systems. Specifically, the embodiments described herein replace known control schemes that have variable bandwidths where the permissible voltage band at the OLTC transformer is continuously adjusted based on the current network conditions as indicated by the measured power flow or current transmission through the tap changer, where such known schemes assume worst case voltage drops and voltage rises in the associated feeders for each respective measured current or power flow values at the OLTC transformer. This leads to unnecessary tap changing operations. More specifically, additional information is used to reach a more realistic and accurate approximation for the present network state. Information such as actual load information, time-of-day data, and solar clear day data are used to generate a priori values for the present load demand and generation in the grid. Such a priori values include uncertainties, which are also calculated. Such uncertainties associated with a priori values are constrained through the use of the information described above. Based on these a priori values and the associated uncertainties, and the measured current or power flow through the OLTC, the currents at each bus in the network are estimated, and based on these estimated currents and the uncertainties (i.e., covariance) for such estimated bus currents, the voltages at each bus in the network are estimated with associated estimated voltage uncertainties, including inferring the critical voltage at the end of the feeder. The smaller the uncertainty in the a priori currents, the smaller the uncertainty in the bus voltage estimations. These voltage estimates and their uncertainties are used to compute the permissible voltage band at the tap changer. This estimation approach allows obtaining a more accurate assessment of the prevailing network state rather than invariably assuming the worst case as is done in the basic variable bandwidth approach. The more accurate estimations of power/current flows through the feeder system, and therefore the tap changer, facilitate relaxing restrictions. This in turn will widen the permissible voltage range at the OLTC transformer leading to less tap changing operations.

Therefore, the embodiments described herein dynamically and adaptively regulate voltage while decreasing tap changes with respect to most known tap changer control systems, thereby facilitating smooth and stable voltage control on the feeders downstream of the transformer regardless of variable electrical conditions due to fast variations in loads and distributed generation (DG). The decreased number of tap changes facilitates extending the service life of the tap changers and improves the regulation of voltage on electric distribution networks.

An exemplary technical effect of the methods, systems, and apparatus described herein includes at least one of: (a) providing an adaptive and variable tap changer control scheme, which is dependent on power flow over the tap changer and thus regulates the permissible voltage range at the tap changer as a function of the current network state, thereby facilitating smooth and stable voltage control on the feeders downstream of the OLTC transformer regardless of variable electrical conditions due to fast variations in loads and distributed generation; (b) substantially decreasing the number of tap changes used to regulate voltage on feeders downstream of distribution transformers; (c) substantially decreasing the number of tap changes, thereby extending the service life and decreasing the maintenance costs on tap changers; and (d) leveraging additional information such as time-of-day and solar clear day data to determine a priori values for the present load demand and generation in the grid, thereby estimating the voltages at each bus in the network, including inferring the critical voltage at the end of the feeder from measurements at the tap changing transformer.

Exemplary embodiments of electric power distribution systems for transmitting electric power to customer loads downstream of a distribution transformer, and methods of operating such systems and devices are not limited to the specific embodiments described herein, but rather, components of systems and/or steps of the methods may be utilized independently and separately from other components and/or steps described herein. For example, the methods may also be used in combination with other systems requiring electric power transmission and the associated methods, and are not limited to practice with only the transmission and distribution systems and methods as described herein. Rather, the exemplary embodiment can be implemented and utilized in connection with many other transmission applications that are currently configured to transmit and receive electric power, e.g., and without limitation, distribution systems in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric power system comprising:
an on-load tap changing (OLTC) transformer comprising a plurality of primary windings and a plurality of secondary windings, at least a portion of said primary windings and at least a portion of said secondary windings inductively coupled to each other;
at least one on-load tap changer coupled to at least one of said plurality of primary windings and coupled to at least one of said plurality of secondary windings, said at least one on-load tap changer selectively configurable to regulate said at least a portion of said primary windings and said at least a portion of said secondary windings that are inductively coupled to each other;
a plurality of buses coupled to said OLTC transformer, said plurality of buses positioned downstream of said OLTC transformer; and
at least one processor coupled to said at least one on-load tap changer, said at least one processor configured to regulate a voltage bandwidth of said on-load tap changer as a function of estimated voltage values of at least one bus of said plurality of buses as estimated based on a priori values of one of power and current transmitted through each bus of said plurality of buses, wherein the a priori values of one of power and current are substantially based on one of measured power and measured current transmission through said on-load tap changer;

wherein said processor is further configured to generate estimations of voltages for said each bus of said plurality of buses.

2. The electric power system in accordance with claim 1, wherein said processor is further configured to generate uncertainty values associated with one or more of:

the a priori values of one of power and current transmitted through said each bus of said plurality of buses; and the estimated voltage values of said at least one bus of said plurality of buses.

3. The electric power system in accordance with claim 1, wherein said processor is further configured to generate, for the a priori values, for said each bus of said plurality of buses one of:

upper power parameters and lower power parameters; and upper current parameters and lower current parameters.

4. The electric power system in accordance with claim 1, wherein said processor is further configured to generate the a priori values of one of power and current transmitted through said each bus of said plurality of buses through one or more of clear day solar radiation data and time-of-day data.

5. The electric power system in accordance with claim 4, wherein said processor is further configured to generate uncertainty values of the a priori values of one of power and current transmitted through said each bus of said plurality of buses through the one or more of clear day solar radiation data and time-of-day data.

6. The electric power system in accordance with claim 1, wherein said processor is further configured to generate tap position commands for said at least one on-load tap changer at least partially based on the regulated voltage bandwidth of said on-load tap changer.

7. The electric power system in accordance with claim 1, wherein said processor is further configured to: generate first estimations of voltages for said each bus of said plurality of buses, wherein the first voltage estimations are substantially based on assumptions of worst case voltage drops and voltage rises for said each bus of said plurality of buses; generate second estimations of voltages for said each bus of said plurality of buses, wherein the second voltage estimations are the estimated voltage values of said each bus of said plurality of buses as estimated based on the priori values; and compare the first voltages estimations with the second voltage estimations.

8. A tap changer for an on-load tap changing (OLTC) transformer, the OLTC transformer including a plurality of primary windings and a plurality of secondary windings, the OLTC transformer further including a plurality of taps, each tap of the plurality of taps coupled to a different portion of at least one of the plurality of primary windings and the plurality of secondary windings, the OLTC transformer coupled to a plurality of buses downstream of the OLTC transformer, said tap changer comprising:

a tap selection device configured to selectively engage a portion of said plurality of taps;

a drive device coupled to said tap selection device; and at least one processor coupled to said drive device, said at least one processor configured to regulate a voltage bandwidth of said on-load tap changer as a function of estimated voltage values of at least one bus of the plurality of buses as estimated based on a priori values of one of power and current transmitted through each bus of the plurality of buses, wherein the a priori values of one of power and current are substantially based on one of measured power and measured current transmission through the OLTC transformer;

wherein said processor is further configured to generate estimations of voltages for each bus of said plurality of buses.

9. The tap changer in accordance with claim 8, wherein said processor is further configured to generate uncertainty values associated with one or more of:

the a priori values of one of power and current transmitted through each bus of the plurality of buses; and the estimated voltage values of the at least one bus of the plurality of buses.

10. The tap changer in accordance with claim 8, wherein said processor is further configured to generate, for the a priori values, for said each bus of said plurality of buses one of:

upper power parameters and lower power parameters; and upper current parameters and lower current parameters.

11. The tap changer in accordance with claim 8, wherein said processor is further configured generate the a priori values of one of power and current transmitted through each bus of the plurality of buses through one or more of clear day solar radiation data and time-of-day data.

12. The tap changer in accordance with claim 9, wherein said processor is further configured to generate uncertainty values of the a priori values of one of power and current transmitted through each bus of the plurality of buses through the one or more of clear day solar radiation data and time-of-day data.

13. The tap changer in accordance with claim 8, wherein said processor is further configured to generate tap position commands for said tap changer at least partially based on the regulated voltage bandwidth of said on-load tap changer.

14. The electric power system in accordance with claim 8, wherein said processor is further configured to: generate first estimations of voltages for each bus of the plurality of buses, wherein the first voltage estimations are substantially based on assumptions of worst case voltage drops and voltage rises for each bus of the plurality of buses; generate second estimations of voltages for each bus of the plurality of buses, wherein the second voltage estimations are the estimated voltage values of each bus of the plurality of buses as estimated based on the priori values; and compare the first voltages estimations with the second voltage estimations.

15. A method of regulating a voltage on at least a portion of an electric distribution system, the electric distribution system including at least one on-load tap changing (OLTC) transformer that includes a plurality of primary windings and a plurality of secondary windings and a tap changer configured to regulate an inductive coupling between the plurality of primary windings and the plurality of secondary windings, the tap changer including at least one processor, the OLTC transformer coupled to a plurality of buses downstream of the OLTC transformer, said method comprising:

measuring one of electric power flow and electric current flow transmitted through the OLTC transformer;

measuring a voltage proximate the secondary windings;

regulating a voltage bandwidth of the tap changer, through the at least one processor, as a function of estimated voltage values of at least one bus of the plurality of buses as estimated based on a priori values of one of power and current transmitted through each bus of the plurality of buses, wherein the a priori values of one of power and current are substantially based on one of measured power and measured current transmission through the OLTC transformer; and generating, through the at least one processor, estimations of voltages for each bus of the plurality of buses.

16. The method in accordance with claim 15 further comprising generating, through the at least one processor, uncertainty values associated with the calculated values of one of power and current transmitted through each bus of the plurality of buses.

17. The method in accordance with claim 15 further comprising generating, through the at least one processor, for the a priori values, for each bus of the plurality of buses one of:

upper power parameters and lower power parameters; and
upper current parameters and lower current parameters.

18. The method in accordance with claim 15 further comprising generating, through the at least one processor, the a priori values of one of power and current transmitted through each bus of the plurality of buses through one or more of clear day solar radiation data and time-of-day data.

19. The method in accordance with claim 18 further comprising generating, through the at least one processor, uncertainty values of the a priori values of one of power and current transmitted through each bus of the plurality of buses through the one or more of clear day solar radiation data and time-of-day data.

20. The method in accordance with claim 15 further comprising generating, through the at least one processor, tap position commands for the tap changer at least partially based on the regulated voltage bandwidth of the tap changer.

21. The method in accordance with claim 15 further comprising:

generating, through the at least one processor, first estimations of voltages for each bus of the plurality of buses, wherein the first voltage estimations are substantially based on assumptions of worst case voltage drops and voltage rises for each bus of the plurality of buses; generating through the at least one processor, second estimations of voltages for each bus of the plurality of buses, wherein the second voltage estimations are the estimated voltage values of each bus of the plurality of buses as estimated based on the priori values; and comparing the first voltage estimations with the second voltage estimations.

\* \* \* \* \*